Jan. 17, 1956 K. B. MacDONALD 2,731,224
FISHING POLE SUPPORT AND POSITIONING DEVICE
Filed June 14, 1952 2 Sheets-Sheet 2

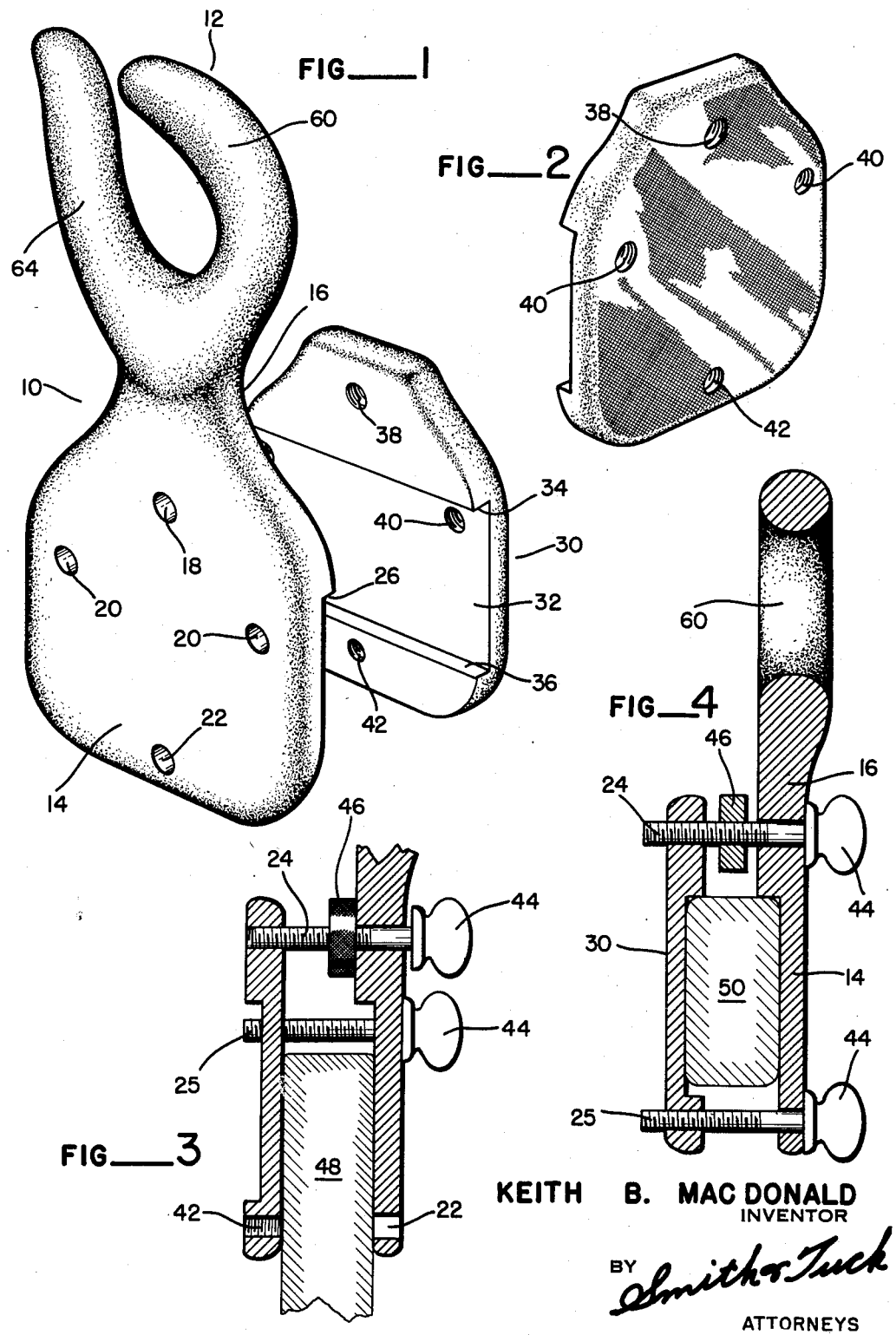

KEITH B. MACDONALD
INVENTOR

BY Smith & Tuck
ATTORNEYS

United States Patent Office 2,731,224
Patented Jan. 17, 1956

2,731,224
FISHING POLE SUPPORT AND POSITIONING DEVICE

Keith B. MacDonald, Seattle, Wash.

Application June 14, 1952, Serial No. 293,626

3 Claims. (Cl. 248—42)

This present invention is drawn to a device formed of two parts, connected by bolts or screws, in such a manner that it may be clamped to the gunwale members or transom of a fishing boat. This device is somewhat distinct from the usual pole-holder which wholly supports the pole in that this present support member engages the pole normally about midpoint and generally the butt end of the pole and the heavy reel, customarily used with such fishing equipment, provide sufficient stability for the inboard end of the pole.

In fishing for certain fish, especially salmon, it is quite common to fish for long periods without a strike, normally due to the fact that these fish migrate in schools, and consequently, to hold a pole for the long interval between schools would be very tiresome. To overcome this condition many forms of rod holders have been provided. Such holders normally are provided with an outboard Y-shaped rest member and an inboard hook which engages the upper surface of the rod handle or butt to resist the normal tendency for the pole to fall overboard. Such devices can generally be classified as those which grip the pole quite securely and thus eliminate most of the danger of losing the gear overboard, but these have the disadvantage of requiring considerable dexterity on the part of the fisherman to recover his pole when a fish strikes, particularly a salmon which is a big powerful game fish. The other type of rod holders, basically the same in structure, from which it is easier to get the pole out, are lacking in the security required and many times demand that an additional safety line be tied to the pole so that it will not be dropped overboard when a fish strikes.

This present invention contemplates having the pole normally with the butt portion and reel well within the grasp of the fisherman, and then supporting the pole at substantially its midpoint so that the tip of the pole can be positioned in keeping with the fishing conditions, or the type of fishing being undertaken. Such an arrangement makes it relatively simple to grasp the pole and begin hooking and playing the fish. This type of fishing has proved to be very popular and my device has been especially constructed so as to give maximum security to the fishing pole as it is being supported in use, and at the same time be so formed as to give the very minimum interference with the releasing of the pole when the fisherman picks it up to play his fish.

An important object of my invention, therefore, is to provide a fishing pole support means adapted to securely support and position a fishing pole on the upper margin of a fishing boat and to offer little, if any, resistance, when the fisherman picks up his pole to play a fish.

A further object is to provide a clamp-on fishing pole support adapted to be securely affixed to a wide variety of boat upper margins.

A further object is to so form the support rest member that the same will offer little, if any, resistance to the moving of the rod in the direction it would normally be moved by a fisherman as he picks up his rod to play a fish.

Further objects, advantages and capabilities will be apparent from the description and disclosure in the drawings, or may be comprehended or are inherent in the device.

In the drawings:

Figure 1 is a perspective view showing the two principal parts of my support device in exploded relationship;

Figure 2 is a perspective view showing the knurled side of the pressure pad;

Figure 3 is a fragmentary, vertical sectional view showing my device as it would be employed clamped on the transom of a boat, for instance;

Figure 4 is a fragmentary vertical sectional view showing my device as it would appear clamped on to an inwale of a boat;

Figure 5:
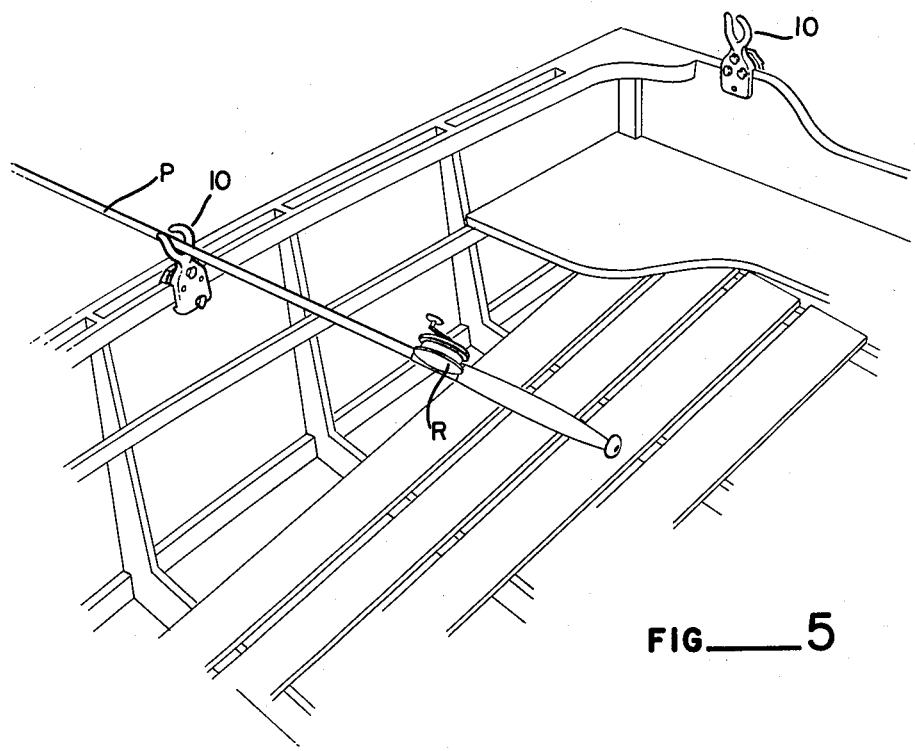
Figure 5 is a perspective view showing the normal manner in which my device is used in association with a boat, which is shown in fragmentary form.

Referring more particularly to the disclosure in the drawings, the numeral 10 designates the principal member of my fishing pole support device. This consists of the forked portion 12, the bearing pad 14, and the connecting web or neck 16. The bearing pad is provided with a plurality of through openings as 18, 20, and 22. These holes are normally somewhat larger than the bolts 24 which they are intended to receive for purposes that will be more fully explained. It has also been found desirable to provide an overhanging ledge at 26 extending transversely entirely across the bearing pad so as to form a rest which will position the bearing pad when it is applied as to the edge of a boat or the top of a board, or structural member.

Adapted to coact with bearing pad 14 is the pressure pad 30. This member is of substantially the same shape as the bearing pad portion 14. It is further provided with preferably a transverse groove as 32 producing the two ledges 34 and 36. These are used to more definitely and securely position the device when the same is in use and adapt my device to many different forms of clamping relationship. The ungrooved side is preferably knurled, as indicated, to increase its holding ability. Pressure pad 30 is provided with similarly placed holes as 38, 40, and 42 which are adapted to coact with holes 18, 20, and 22 respectively in the bearing pad 14. These holes however are preferably threaded internally so as to engage the threaded portions of bolts or screws 24. In this connection it is desired to point out that my device may be made of any suitable material such as wood, plastic or metal. In the case where the softer materials are used, the threaded holes 38, 40, and 42 should be provided with suitable metal bushings so that the thread will not become damaged or excessively worn through use.

Bolts 24 are the form normally referred to as wing bolts or wing screws in that the outwardly extending end instead of being provided with a nut, which would require a wrench, is provided with some form of configuration that permits the easy setting up of the bolt into the clamping position without any separate tools. Wing heads of the form shown at 44 have been found to be quite satisfactory.

There are a number of different ways in which the two pieces of my device can be applied to the margin of a boat. Figures 3 and 4 illustrate two such arrangements. Also Figures 3 and 4 show two different ways in which the bolts are themselves employed. In Figure 4 the bolts pass through the upper holes 38 and 18 and the lower holes 42 and 22. In Figure 3, however, the bolts pass through the upper holes 38 and 18 and the intermediate holes 20 and 40. In this arrangement the upper bolt must form a pivot or fulcrum, and to this end a preferably knurled nut 46 is employed so as to provide a definite spacing for the upper portions of the bearing pad and the pressure pad. Using this as a fulcrum or pivot, the two lower bolts 25 in the intermediate holes then provide a clamp arrangement without the necessity of using the lower holes. There are many other arrangements in which these holes can be used, depending upon the need at the time of use. Figure 3 illustrates what is normally the transom 48 of a boat, while in Figure 4, member 50 indicates the usual inwale of a boat, or it might be some other structural member.

Figure 6:
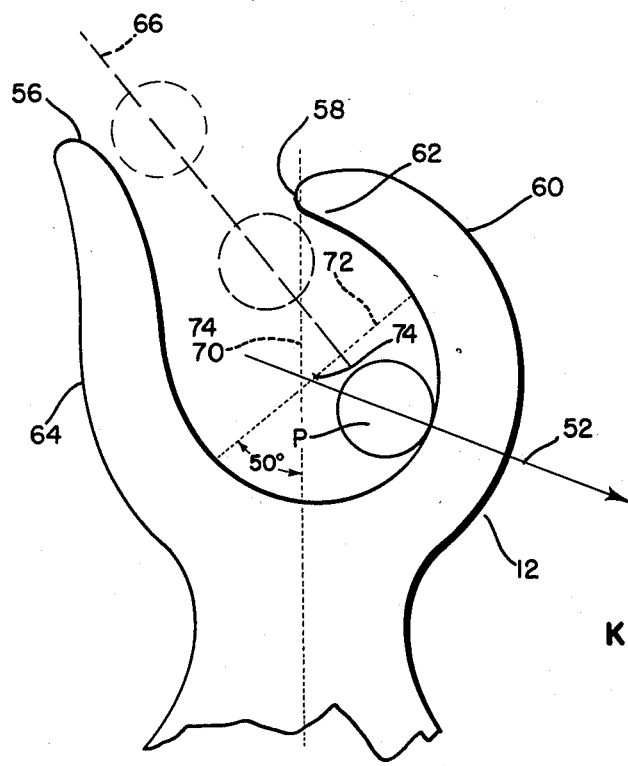
Figure 6 is a face view in elevation showing, in detail, the forked member of my support device.

In Figure 6 a diagrammatic form of view is employed to illustrate the preferred form of my forked member, the same is shown as it would be employed if the front of the boat were to the left as viewed and the line of draft on the pole were substantially as indicated by the arrow 52. In using the device after the showing of Figure 5, the heavy end of the pole P, also weighted by the usually heavy reel R, is inboard and normally resting on the floor of the boat. In Figure 6 the position of the fishing rod has been shown in full lines at 54. Attention is now directed to the relative size of the openings in the forked member which forms the rest and the entrance to this opening which is between points 56 and 58. The rearward fork member 60 describes substantially a semicircle except the upper portion 62 is faired off upwardly. This permits the pole if it were pulled straight up, to take the general course shown by the dashed lines 66. This is substantially the line of movement of the pole as it is picked up by a fisherman, especially if a fish were applying force along the direction of arrow 52. It is to be particularly noted that leg 60 provides unusual security for holding the pole in its proper position and at the same time permits its easy removal when a fish strikes. Coacting with leg 60 is the forward leg 64 where, it will be noted, that surface 56 is faired forwardly, and the spacing between surfaces 56 and 58 is just comfortably larger than the hole P, so that usually even if a heavy fish strikes and attempted to pull the pole out of the boat, the grip or reel would abut the rest member and be arrested in further movement yet would be readily available to the fisherman, who would grasp this and move the pole into substantially the same direction as though it were merely resting against a vertical pin. Such a pin would of course offer none of the security of the present invention.

To more specifically describe the preferred form of the forked member, the dotted line 70 indicates the vertical axis of fork member 10 as viewed in Figure 6. Line 72 includes a diameter of a circle with its center at 74. This diameter intersects the vertical axis at approximately 50 degrees, and is substantially at right angles to line 66. The closed end of the fork is substantially a semi-circle below the diameter line 72. The inner curve of leg 60 continues upwardly diverging outwardly from the circle. Leg 64 similarly diverges outwardly from the circle and then a reverse curve is applied to form an ogee inner curved surface. The opening between legs 60 and 64 is substantially one-half the diameter of the circle. Supporting members formed generally according to this embodiment have proven to be quite efficient in use.

It is believed that it will be clearly apparent from the above description and the disclosure in the drawings that the invention comprehends a novel construction of a fishing pole support and positioning device.

Having thus disclosed by invention, I claim:

1. A fishing pole support adapted to be clamped on the side of a boat, comprising: a fork member having a broad bearing pad and having an upwardly extending arm bifurcated at its upper end to form a first and second prong in the plane of said bearing pad side by side bordering an upwardly open slot; a separate broad pressure pad positioned in face-to-face parallel relationship to said bearing pad; one of said pads having a series of untapped holes and the other of said pads having a series of tapped holes aligned with said untapped holes and a plurality of clamping bolts positioned in some of said untapped holes and threadedly engaged in corresponding tapped holes whereby said fork member and pressure pad may be clamped on the side of the boat; said first prong having its inner face formed generally in the form of a semi-circle facing the second prong and said second prong having its inner face formed generally with an ogee configuration with a concave lower portion facing said first prong and with its upper portion convex and extending away from said first prong, the upper end of said first prong overhanging the base of said slot in a manner so that a fishing rod in said slot is obstructed from removal directly vertically upwards and can only be removed by movement oblique to the vertical along said upper portion of said second prong.

2. The subject matter of claim 1 in which one of said pads has a wide horizontal groove extending from edge to edge of one face and the other of said pads has an overhanging horizontal ledge aligned with the upper margin of said groove with the portion of the pad below said ledge lying in a vertical plane, one of the pairs of tapped and untapped holes being disposed at a level above the upper margin of said groove and ledge and one of said bolts being positioned in said pair of holes and a nut on the bolt abutting the pad having the untapped holes whereby the nut may form a fulcrum for a tilting of the pads relative each other permitted by having the untapped holes loosely fit said bolts, an aligned pair of said tapped and untapped holes being positioned at a level below the lower margin of said groove and another aligned pair of said tapped and untapped holes being disposed near the level of the upper portion of said groove.

3. A fishing pole support adapted to be clamped on the side of a boat, comprising: a fork member having means on its lower end for clamping the support to the side of a boat and having its upper end formed as an upwardly extending integral arm bifurcated to form a first and a second prong side by side bordering an upwardly open slot, the base of said slot substantially defining a semi-circle having its center adjacent the vertical axis of said arm, said first and second prong diverging outwardly from said semicircle approximately at the chordal diameter of the semicircle which forms an angle with said vertical axis of approximately 50 degrees, said first prong extending over the base of said slot and terminating adjacent said vertical axis and said second prong having a reverse curve at its upper end thereby forming an ogee inner curved surface, the distance between said prongs at the mouth of said slot being substantially one-half said diameter, whereby an object in said slot is obstructed from removal directly vertically and can only be removed by movement oblique to the vertical along said second prong.

References Cited in the file of this patent

UNITED STATES PATENTS

| | | |
|---|---|---|
| 518,986 | Cain | May 1, 1894 |
| 1,581,033 | Snyder | Apr. 13, 1926 |
| 1,896,898 | Hildebrand | Feb. 7, 1933 |
| 2,182,085 | Kellner et al. | Dec. 5, 1939 |
| 2,430,112 | Hamre | Nov. 4, 1947 |
| 2,518,908 | Korus | Aug. 15, 1950 |
| 2,541,146 | Bahr | Feb. 13, 1951 |
| 2,622,829 | Waltz | Dec. 23, 1952 |

FOREIGN PATENTS

| | | |
|---|---|---|
| 14,246 | Great Britain | July 4, 1908 |